(12) United States Patent
Shalabi et al.

(10) Patent No.: US 8,849,829 B2
(45) Date of Patent: Sep. 30, 2014

(54) TRENDING SEARCH MAGAZINES

(75) Inventors: Sami Mohammed Shalabi, Winchester, MA (US); Maurice Bennett Shore, Carlisle, MA (US); Cassandra Lynn Doll, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 39 days.

(21) Appl. No.: 13/312,609

(22) Filed: Dec. 6, 2011

(65) Prior Publication Data

US 2013/0144869 A1    Jun. 6, 2013

(51) Int. Cl.
*G06F 17/30* (2006.01)

(52) U.S. Cl.
USPC ............................ 707/738; 707/771; 707/802

(58) Field of Classification Search
USPC ......................................... 707/738, 771, 802
See application file for complete search history.

(56) References Cited

U.S. PATENT DOCUMENTS

| | | | |
|---|---|---|---|
| 2006/0069808 A1* | 3/2006 | Mitchell et al. | 709/246 |
| 2006/0129973 A1 | 6/2006 | Newcorn et al. | |
| 2008/0082903 A1 | 4/2008 | McCurdy et al. | |
| 2009/0228774 A1 | 9/2009 | Matheny et al. | |
| 2010/0312596 A1* | 12/2010 | Saffari et al. | 705/7 |
| 2011/0060994 A1 | 3/2011 | Maxwell et al. | |
| 2011/0093788 A1 | 4/2011 | Rutman et al. | |
| 2011/0099071 A1 | 4/2011 | Johnson | |
| 2012/0072477 A1* | 3/2012 | Carter et al. | 709/201 |
| 2012/0216122 A1* | 8/2012 | Wong et al. | 715/738 |

OTHER PUBLICATIONS

"Editions by AOL," Editions.com, accessed at http://www.editions.com/main, accessed on Apr. 30, 2012, AOL Inc., 2011, 10 pages.
"Livestand from Yahoo!" Internet Archive: Way Back Machine, Livestand.com, accessed at http://web.archive.org/web/20110411234034/http://www.livestand.com/, accessed on May 1, 2012, Yahoo! Inc., Apr. 2011, 1 page.
McCue, Marci, "Flipboard Launches World's First Social Magazine," Flipboard.com, accessed at http://flipboard.com/press/flipboard-launches-worlds-first-social-magazine, accessed on Apr. 30, 2012, Flipboard Inc., 2010-2012, 3 pages.
"Pulse News," Internet Archive: Way Back Machine, Pulse.me, accessed at http://web.archive.org/web/20110620025137/http://www.pulse.me/, accessed on May 1, 2012, Alphonso Labs, Jun. 2011, 1 page.

* cited by examiner

*Primary Examiner* — Son T Hoang
(74) *Attorney, Agent, or Firm* — Sterne, Kessler, Goldstein & Fox P.L.L.C.

(57) ABSTRACT

Embodiments include methods and systems for generating trending search magazines. Trending topics may be identified from news servers. A search magazine edition may be generated for a trending topic. The edition has a search magazine format, including a news section, a user-generated media section and an about section. News and article servers are searched for articles on the trending topic. Media is searched for on the trending topic. Descriptive information is searched for on the trending topic. The search results of these automatic searches are transformed into the search magazine format of the edition and provided for display in a current display view of a mobile device.

12 Claims, 9 Drawing Sheets

TRENDING SEARCH MAGAZINES

TECHNICAL FIELD

The embodiments relate generally to media applications on computing devices.

BACKGROUND

Magazines are printed publications that provide readers articles and print media in a layout format designed by the publisher. The design of each magazine edition requires time, effort and planning. Some magazines are directed to news and current topics, but are usually published at weekly or monthly intervals. In today's 24-hour news cycle, such news may be old news. Users may visit online versions of a magazine, some of which may update some content. However, publisher processes of design, presentation and publication of an online magazine are far from trivial and the layout of the material is not tailored for different mobile devices.

News and related media content may be downloaded and displayed on mobile devices. Some media applications allow a user to specify what news websites should be referenced in a single view. However, this combined view is rather static and not topic specific. Such applications are insufficient for collecting and displaying the latest news and media available for a hot topic or a topic that is trending hot.

BRIEF SUMMARY

Methods and systems for generating trending search magazines are provided. One or more trending topics are identified. A search magazine edition is generated based on a trending topic. The edition has a search magazine format comprising a news section for news articles on the trending topic and a user-generated media section for media related to the trending topic shared by users, and an about section for descriptive information retrieved for the trending topic. News servers are searched for news articles on the trending topic. Media is searched for on the trending topic. Media searches may involve searches of user-generated media and other social media. Descriptive information is searched for on the trending topic. The search results of these automatic searches are transformed into the search magazine format of the edition and provided for display in a current display view of a mobile device.

Other embodiments of this aspect include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments are described herein with reference to illustrations for particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

FIGS. 1A-1D are used to describe magazine editions. Magazine editions display content in user designed layouts tailored to the displays of specific mobile devices. Instances of magazines are presented as editions. Editions include organized content sections that have multiple articles or posts related to the topic of the edition. Editions may be generated by subscription providers, such as magazine or newspaper organizations. Editions may also involve content generated by other content providers, including consumer, user-generated or social media.

A trending edition is a search magazine edition. Search magazines editions are magazine editions directed to providing an effective and visually pleasing way of collecting and displaying available information on a hot topic or a topic that is trending towards greater relevance or popularity. Search magazine editions search, gather and present information about a topic of the magazine edition from news and content providers, user-generated sources and other informational sources.

Figure 1A:
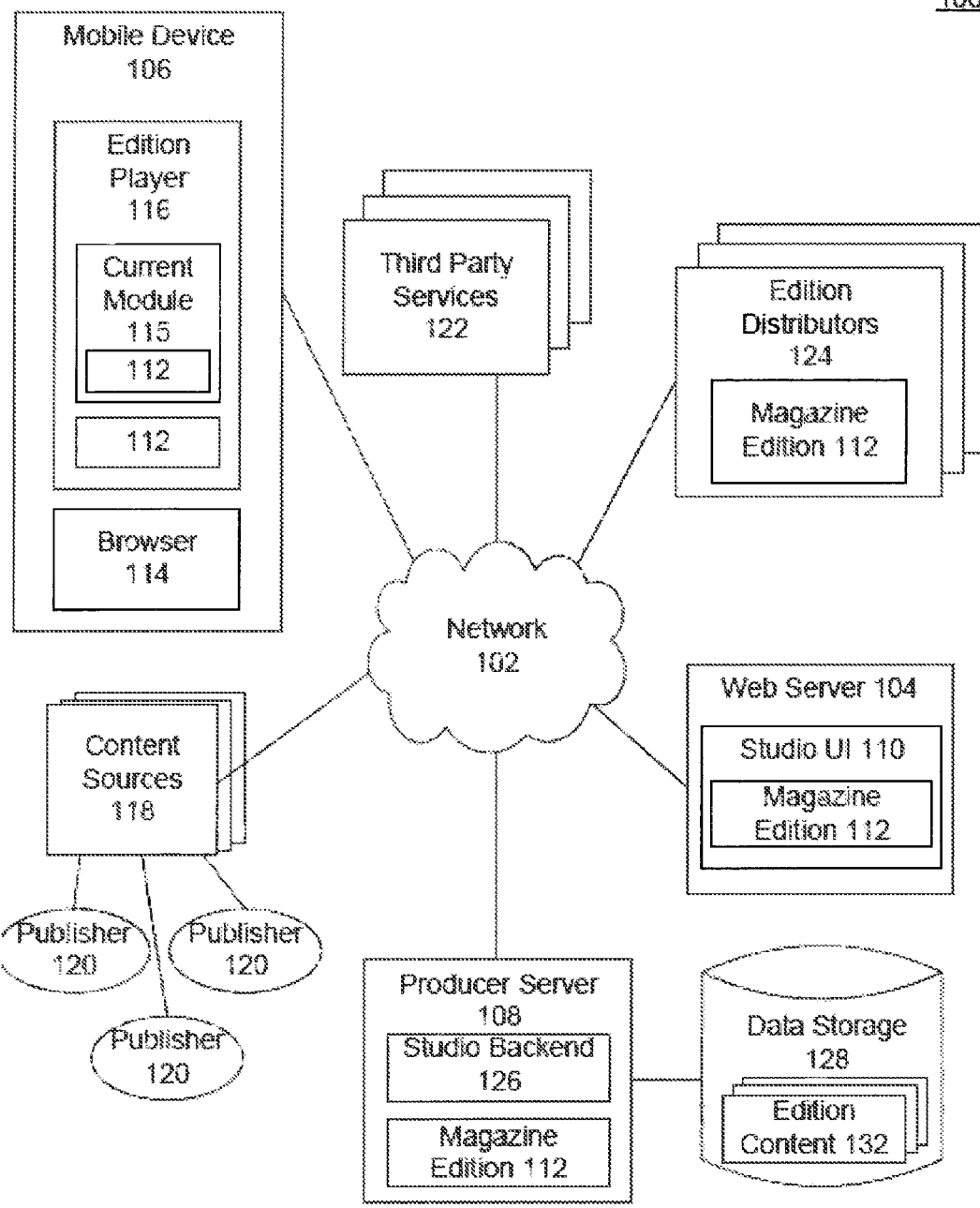
FIGS. 1A-1D illustrates a system for trending magazine editions, according to an embodiment.

FIG. 1A is a block diagram 100A of a distributed system environment. Distributed system environment 100A includes one or more networks 102, web servers 104, producer servers 108 and mobile devices 106.

Network 102 may be any network or combination of networks that can carry data communications. Such a network 102 may include, but is not limited to, a local area network, metropolitan area network, and/or wide area network such as the Internet. Network 102 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

Web server 104 is a computing device or an application executing on a computing device that hosts multiple websites. A website is one or more resources associated with a domain name and hosted by one or more web servers 104. An example website is a collection of web pages formatted in hypertext markup language (HTML) that can contain text, images, multimedia content, and programming elements, such as scripts.

Web server 104 hosts studio user interface ("UI") 110. Studio UI 110 enables users, such as publishers 120, to design interactive magazine editions 112 that may be distributed to multiple mobile devices 106.

Publisher 120 may access studio 110 using a web address that is hosted on web server 104. Once accessed, publisher 120 may use studio 110 to design the layout of magazine edition 112 for heterogeneous computing devices 106. In another embodiment, publisher 120 may download studio 110 onto a mobile device 106 as a standalone application, plugin or extension to browser 114.

Magazine edition 112 may be designed using studio UI 110. Magazine edition 112 displays edition content to users in, for example, a format specified by publishers 120. However, unlike conventional applications that include a separate version for each mobile device having a particular operating platform, edition content displayed using magazine editions 112 may be displayed on mobile devices 106 in a format that is specified by a particular publisher, regardless of the native operating platform particular to mobile device 106. Magazine editions 112 may also layout edition content according to the size of a display screen of mobile device 106.

Mobile device 106 is an electronic device that is under the control of a user and is capable of requesting and receiving resources over network 102. Example mobile devices 106 are mobile communication devices such as smart phones and tablet computers. Mobile device 106 typically includes an application, such as a web browser (or simply browser) 114. A user controls browser 114 to request resources over network 102. A user requests a resource by typing the website address associated with the resources that is stored on web server 104. For example, a user, such as publisher 120 may use browser 114 to access studio UI 110 to design an interactive magazine edition using mobile device 106.

Mobile device 106 also includes edition player 116. Edition player 116 displays magazine editions 112 to users. Magazine edition 112 displays dynamic media content on mobile devices 106, where mobile devices have different specifications and display screen size. Edition content included in magazine editions 112 includes content downloaded to magazine editions 112 using content sources 118. To display magazine editions 112, edition player 116 may use a current module 115 or display edition content using edition player 116.

Current module 115 stores magazine editions 112 which are published by publisher 120. Current module 115 may be downloaded to mobile device 106 from, for example, producer server 108 using network 102 or using another interface. Typically, once current module 115 is downloaded to mobile device 106, a user uses current module 115 to subscribe to magazine editions 112. Once subscribed, current module 115 uses mobile device 106 to download magazine editions 112 from producer server 108, or edition distributor 124. Current module 115 also updates magazine edition 112 with new edition content. In an embodiment, current module 115 also provides a user with a listing of recommended magazine editions 112 that may be of interest to the user and that a user may subscribe to.

Producer server 108 includes studio backend 126. Studio backend 126 allows for a design, development and implementation of magazine editions 112. Studio backend 126 communicates with studio UI 110 when publisher 120 uses studio UI 110 to design magazine edition 112.

Once publisher 120 completes designing magazine edition 112 using studio UI 110, magazine edition 112 is uploaded to producer server 108 for storage and distribution. In an embodiment, magazine editions 112 may be stored on producer server 108 in a memory storage described in detail in FIG. 5. In another embodiment, publisher 120 may upload magazine edition 112 to edition distributors 124. A user may access edition distributor 124 and download magazine edition 112 to mobile device 106. In an embodiment, once publisher 120 decides to distribute an upgraded magazine edition 112, mobile devices 106 that include a previous version of magazine edition 112 are synchronized with the upgraded magazine edition 112.

Content sources 118 provide edition content 132 to magazine edition 112. Example content sources 118 include data feeds, RSS feeds, social streams, user-generated media sources, multi-media sources via media RSS, etc. Content source 118 is typically associated with a publisher 120. Publisher 120 owns a particular content source 118 and controls edition content 132 that is distributed via content sources 118 over network 102.

Producer server 108 receives edition content 132 from content sources 118. Once received, producer server 108 stores edition content 132 in data storage 128. Data storage 128 may be a memory storage described in detail in FIG. 5. In an embodiment, data storage 128 may include a database for storing edition content 132. When magazine edition 112 executing on edition player 116 requests edition content 132, producer server 108 retrieves edition content 132 is retrieved from data storage 128 and transmits edition content 132 to edition player 116.

Third party services 122 provide services to magazine editions 112. For example, third party services 122 provide streaming video that may be accessed by a uniform resource locator ("URL") link included in magazine edition 112. In another example, third party services 122 determine that a user read a particular article included in magazine edition 112. In another example, third party services 122 provide advertisements for display within magazine edition 112. In another example, third party services 122 provide check out services for merchandise items that are provided for purchase within magazine edition 112.

Edition distributors 124 distribute applications, such as magazine editions 112 to mobile devices 106. For example, when publisher 120 designs magazine edition 112, publisher 120 may elect a particular edition distributor 124 to distribute magazine edition 112. When publisher 120 elects to distribute magazine edition 112 using a particular edition distributor 124, magazine edition 112 is uploaded to edition distributor 124. A user may then use mobile device 106 to access edition distributor 124 and upload magazine edition 112 onto mobile device 106 for an agreed upon fee.

Figure 1B:
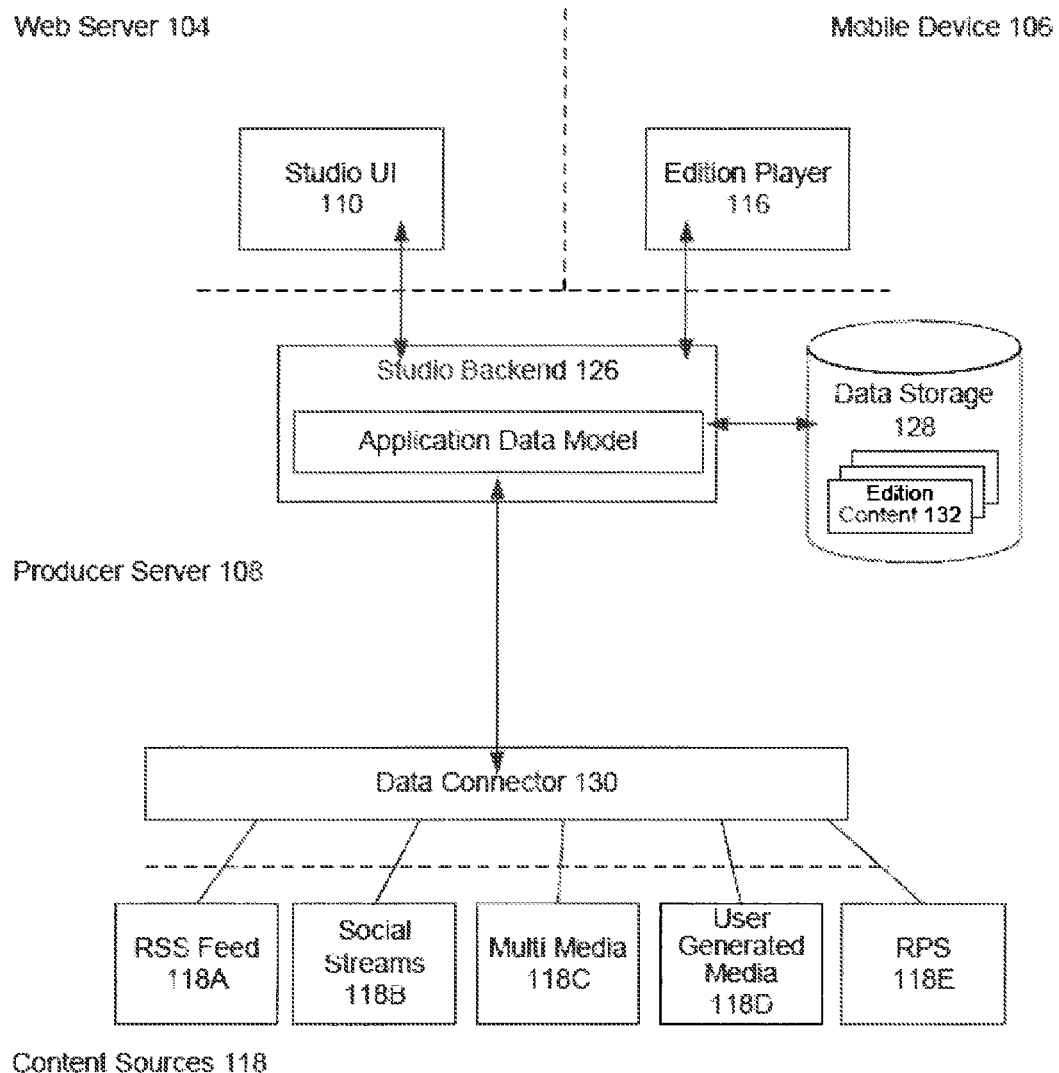

FIG. 1B is a block diagram 100B of components in distributed system 100 that generate and distribute magazine editions.

As described herein content sources 118 provide edition content 132 that is distributed across the web via network 102. For the edition content 132 to be distributed using magazine editions 112, content sources 118 are connected to producer server 108. In an embodiment, data connector 130 connects multiple content sources 118 and retrieves edition content 132.

Data connector 130 receives data from content sources 118. Data connector 130 may receive edition content 132 from content sources 118 in real-time or at configurable intervals that may be set by a system administrator. Once data connector 130 receives edition content 132 from content sources 118, data connector 130 transmits edition content 132 to data storage 128.

As described herein, data storage 128 distributes data from content sources 118 to magazine editions 112. For example, mobile device 106 may request data for particular magazine editions 112 at configurable time intervals that may be configured by the user subscribing to magazine editions 112.

Studio backend 126 receives the designed magazine editions 112 from studio UI 110. As described herein, studio UI 110 allows publishers 120 to design dynamic and interactive magazine editions that display edition content 132 provided by their content sources 118. Once publisher 120 completes designing magazine edition 112, publisher 120 uploads magazine edition 112 to studio backend 126. Studio backend 126 then stores the uploaded magazine editions 112 on producer server 108 and/or distributes magazine editions 112 to mobile devices 106 or edition distributors 124.

Studio backend 126 includes application data model. Application data model (described in detail below) includes a format that displays edition content 132 within magazine editions 112. When publisher 120 uses studio UI 110 to create a particular magazine edition 112, studio UI 110 presents publisher 120 with application data model 134 framework that publisher 120 may configure to include edition content 120 for presentation to a user.

Upon a user request from mobile device 106, studio backend 126 may distribute magazine editions 112 to mobile devices 106. Each magazine edition 112 includes application data model 134 that is configured by publisher 120.

When magazine edition 112 is uploaded to mobile device 106, magazine edition 112 is populated with edition content 132. For example, producer server 108 provides edition content 132 from data storage 128 to magazine edition 112. As edition content 132 is updated with new edition content 132 from content sources 118, producer server 108 synchronizes edition content 132 included in magazine edition 112 with the new edition content 132 that is included in data storage 128.

In an embodiment, the synchronization may occur at configurable time intervals that may be configured by a user using mobile device 106. For example, a user may configure magazine edition 112 to query data storage 128 for new content every hour, every twelve hours, once a day, when requested by a user, etc. In a further embodiment, magazine edition 112 receives edition content 132 from data storage 128 that has been updated since the previous synchronization period, as to minimize the transmission of data over network 102.

Figure 1C:
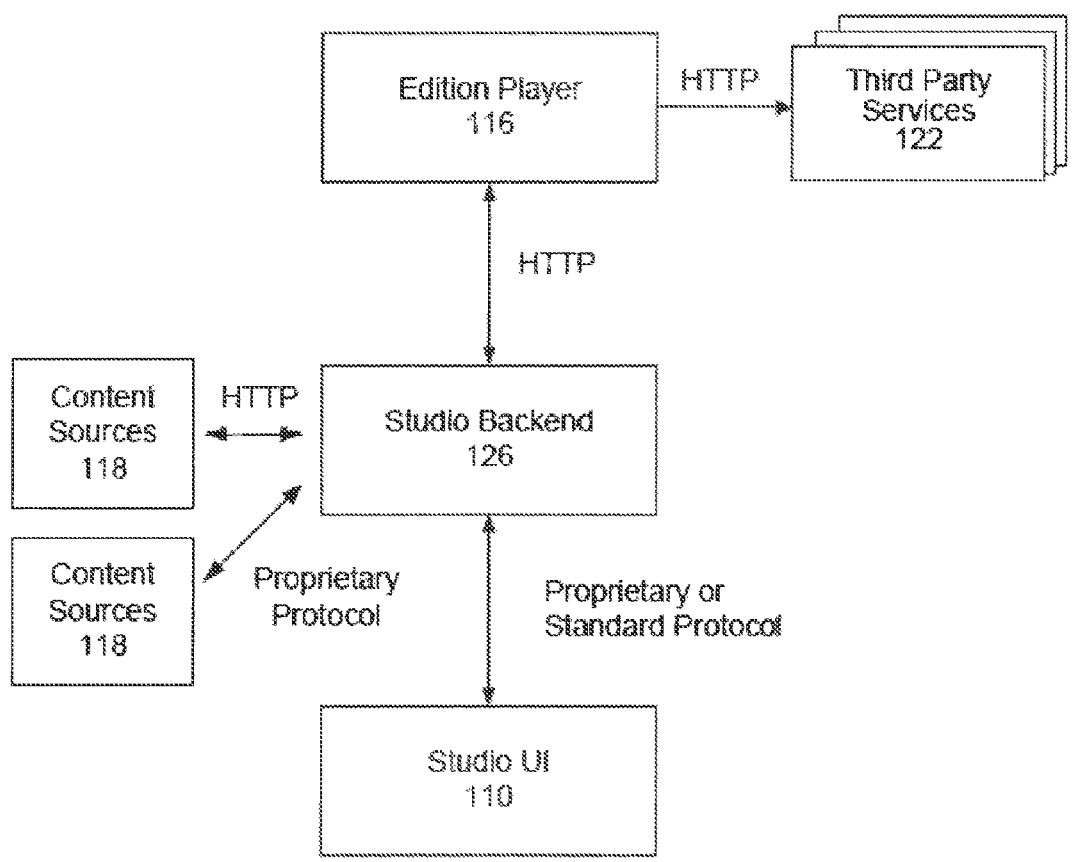

FIG. 1C is a block diagram 100C that describes an exemplary communication interface between the components within the distributed system.

For example, edition player 116 may communicate with studio backend 126 using HTTP over network 102. Edition player 116 may also communicate to third party services 122 and edition distributors 124 using HTTP.

Studio UI 110 may communicate with studio backend 126 using a Google Web Toolkit ("GWT") infrastructure. A person skilled in the art will appreciate that GWT allows web application developers to design JavaScript front-end applications using Java source code. In an embodiment GWT uses protocol buffers, also known to a person of ordinary skilled in that art, to pass data that includes magazine editions 112, templates, edition content 132, etc., between studio UI 110 and studio backend 126.

Studio backend 126 also communicates with a variety of content sources 118. In one embodiment, studio backend 126 may be configured to communicate with content sources 118 using a proprietary communication protocol that is specified by a particular content source 118. In another embodiment, studio backend 126 may also communicate with content sources 118 using HTTP.

Figure 1D:
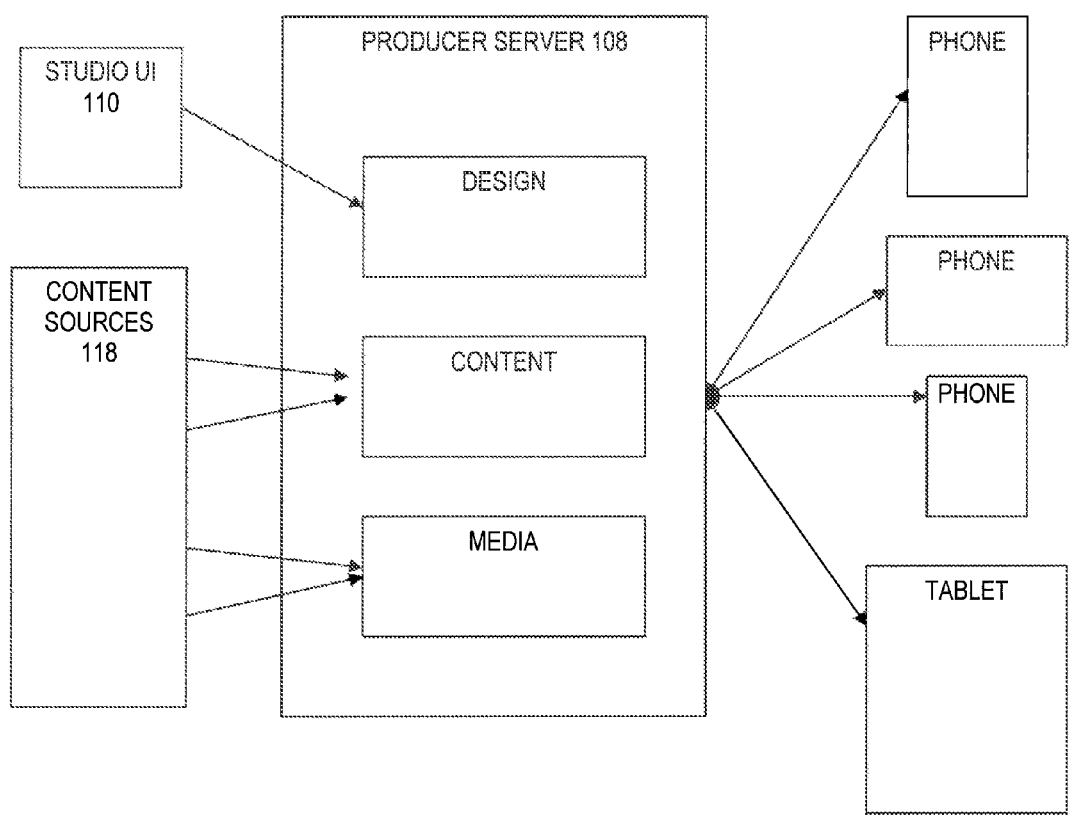

FIG. 1D illustrates an example magazine edition system 100D, according to an embodiment. User studio UI 110 is used to design a magazine edition 112 that has a different layout for content received from content sources 118, or a layout that adjusts for mobile device having different specifications, such as mobile device types and sizes.

Magazine editions 112 can involve time-sensitive content that changes on a monthly, weekly, daily, hourly or real-time basis. It is important that mobile devices 106 display the most recent edition and remain functional.

Embodiments for providing trending search magazine editions are provided. One or more news or transit servers may be queried for trending topics. News servers may include reader servers that handle and serve read and post articles, including Usenet articles. News servers may include transit servers that exchange articles with other servers. News servers may either be always on or provide articles on a request or as hoc basis. News servers may use protocols and information commonly utilized for article distribution.

Such news servers may tag articles with a number of different keywords, including a topical keyword. If a search magazine edition does not already exist for a topic that reaches a relevance threshold, a search magazine edition is generated. Otherwise, the existing search magazine edition may be updated with new content. The new trending edition will be given a label or title that is the keyword or related term of the trending topic. A trending topic is a hot topic or a topic that is moving or rising into the news at the current hour.

A search magazine edition may search, gather and present information about a trending topic from news and content providers, user-generated sources and other informational sources. A search magazine edition presents a dynamic display of articles and media content about a trending topic collected from all over the Internet. A publisher may configure the display and the layout may be easily designed for multiple heterogeneous mobile devices.

Articles and content, including news, may be retrieved by searching for the articles and content. This may include searching news feeds, local databases, remote databases or web content to find relevant and timely articles. Searching may particularly focus on recently published articles and content made available within a most recent period of time. Articles of magazine editions may also be searched.

User-generated media on the trending topic may be searched. This may include user submitted photos and videos. Such photos may be taken at or in the proximity of an event. Videos may include event coverage, interviews or commentary. Social media may be searched, including blogs, micro blogging sites, and social networking websites. Posts to such sites during a certain period of time may be searched, categorized, normalized or moderated. If authors of such posts wish to spread information about themselves, such information may also be appropriately considered for searching.

Descriptive information may be searched for on the trending topic. This may include encyclopedic types of information from a variety of sources including published information or user contributed information. Factual articles may contribute to the descriptive information. Biographical information for public figures, historical persons, executive officers, or other persons of interest may be searched. This may include individuals or groups of people that are the focus of a trending topic. Auxiliary figures or groups referenced in the content may also be searched.

Search results for the trending topic may be transformed into a search magazine format, as designed by the publisher. A search magazine edition may present content in several sections. According to an embodiment, the search magazine format includes an articles section for articles on the trending topic. There may also be a user-generated media section for media related to the trending topic. The user-generated media section may include any combination of a user video upload portion, a user photo upload portion and/or user social media portion. The search magazine format also includes an about section for descriptive information retrieved for the trending topic. The results may be provided to a mobile device and rendered as a magazine edition in a current display view of the mobile device. This may be performed as described above for FIGS. 1A-1D.

Figure 2:
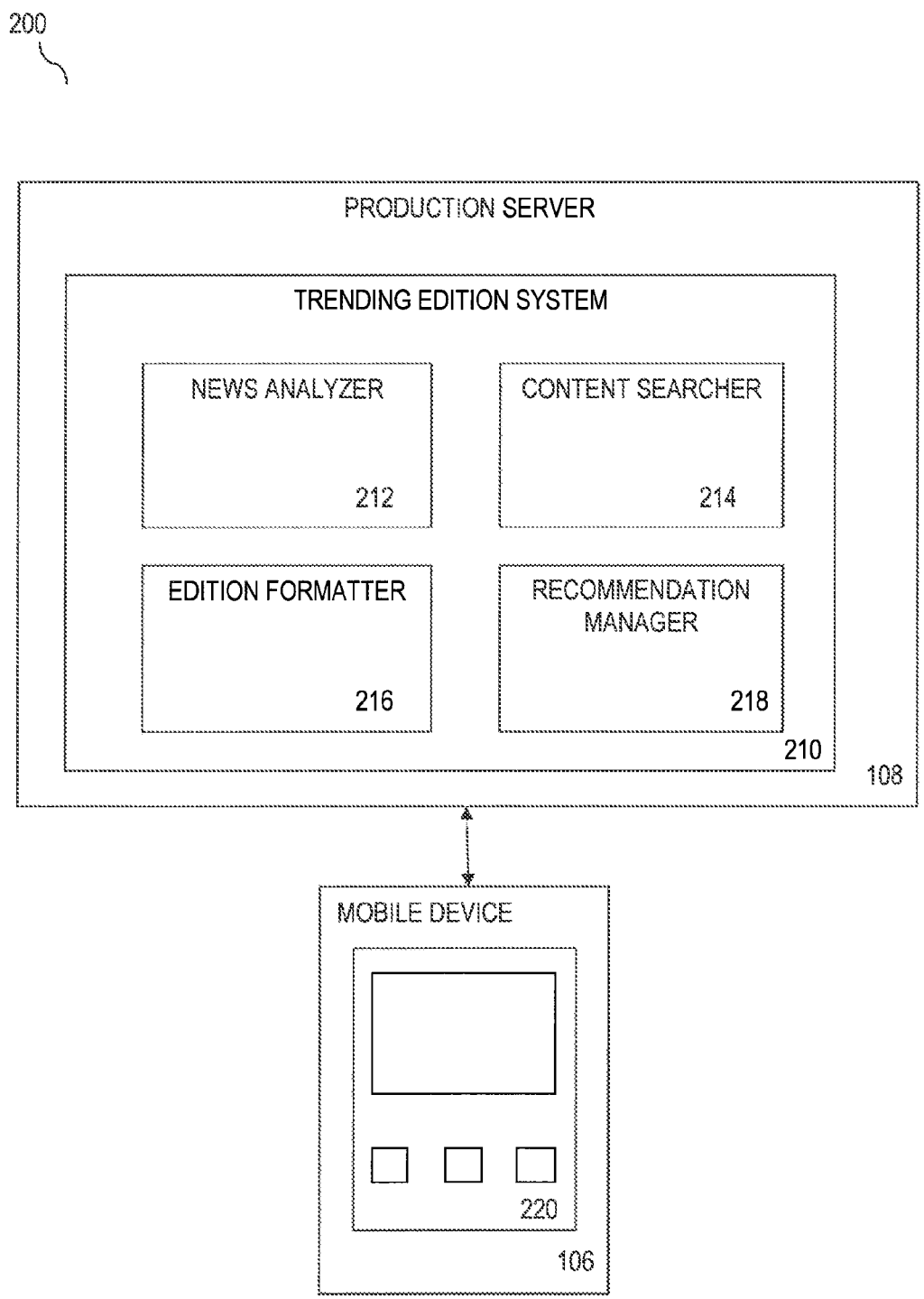
FIG. 2 illustrates a system for trending magazine editions, according to an embodiment.

FIG. 2 illustrates an example magazine edition system 200 for providing trending search magazines, according to an embodiment. System 200 includes trending edition system 210 and mobile display 220. System 210 may be implemented on or implemented with one or more computing devices, such as production server 108. System 210 may also be implemented by an edition distributor coupled to producer server 108, directly or over a network 102. System 210 may be software, firmware, or hardware or any combination thereof in a computing device. A computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Edition system 210 may be coupled to mobile device 106, according to an embodiment. Computing devices such as a monitor, all-in-one computer, smart phone, tablet computer, remote control, etc., may include a touch screen display 220 that accepts user input via touching operations performed by a user's fingers or other instrument. For example purposes, a touch sensor grid may overlay the display area. The touch sensor grid contains many touch sensitive areas or cells that may be used to locate the area closest to the input of a user's touch.

Example touch operations using touch screen display 220 may include (but are not limited to) pinching, finger (or other stylus or object) touches, finger releases, and finger slides. The touch screen display 220 may include a screen or monitor that may render text and/or images.

According to an embodiment, trending edition system 210 includes news analyzer 212, content searcher 214 and edition formatter 216. System 210 may also include recommendation manager 218. News analyzer 212 is configured to query one or more news servers for trending topics. This may involve contacting or receiving news servers and receiving news articles and associated keywords, including in news feed.

News analyzer 212 identifies or receives an identification of trending topics. This identification may be based on whether topic keywords are relatively fresh or are related to up and coming news story topics. News story topics may be business related, entertainment related, politically related, health related, world events related, etc.

Trending topics are selected based on any number of factors. The reliability of a news source or the volume of articles about the topic may be considered. Trending topics may be determined by subject matter and/or a user's location, age, viewing history, preferences or other characteristics of the user's viewing habits. Some topics may not be considered for edition generation until a certain threshold or volume of news is detected for a trending topic. In some cases, trending editions may be selected for generation based only a first detection or a single detection of a news story. A user may choose to have a handful of trending editions or a larger number of trending editions.

Edition formatter 216 is configured to generate a magazine edition, similar to the magazine edition 112 described above, for a trending topic having a search magazine format. This format includes a news section for news articles retrieved for the trending topic. It also includes a user-generated media section for media related to the trending topic shared by users. This section may include a user video upload portion, a user photo upload portion and/or a user social media portion. User-generated media may include blog posts, micro blog entries, videos and images uploaded by users, entries or material on social networking websites, etc. The edition format also includes an about section for descriptive information retrieved for the trending topic.

The sections and articles (or posts) of the trending edition may be populated by content found throughout the Internet. Content searcher 214 is configured to search for additional news articles on the trending topic. This may involve searching the news server that provided the trending topic news. This may also include searching other news or transit servers, news feeds, websites, databases or any other current news source.

Content searcher 214 is also configured to search for media on the trending topic, including media found on websites, feeds, databases, user-generated media, etc. Content searcher 214 is further configured to search for descriptive information on the trending topic. This may include informational sources on websites, databases, online publications, etc.

News analyzer 212 may extract a title, description, author, and fair use excerpt from queried news articles. Content searcher 214 may use this information to search for extended media, including other images, videos, audio, maps, etc.

Edition formatter 216 is configured to transform results of the searches into the search magazine format of the edition and provide the edition to a mobile device for display in a current display view of a mobile device. Edition formatter 216 may also normalize a title, description, author, and excerpt. For example, normalizing a title may include one or more of replacing extraneous characters, removing extraneous characters, converting all characters to the same case, correcting spelling, and removing a link associated with the title.

According to a further embodiment, edition formatter 216 may create a trending edition and sections for the trending edition. The semantic meaning of a term or topic may be extracted and used to determine a template. The template of the sections may also be determined based on the subject type of the trending topic. For example, if the topic is a person, the biographical profile and resume may be searched and formatted. If the topic is a company, its history and shared price may be searched and formatted. If the topic is a place, maps and culture may be searched and formatted. In some case, sections may be established before searching is performed. According to a further embodiment, these templates may be designed by a publisher using Studio UI 110. Studio UI allows the publisher to see a live preview of the template for an edition. The live preview may be shown for a number of different device display screens.

According to another embodiment, the search magazine format for a trending edition may also include a trending ID, a trending indicator, and a trending category. Such features allow for manual or automatic trending edition management. A trending ID may be a number identifier for trending topics. A trending indicator is switched to on when an edition is trending. This allows for determining how or when a search magazine is actively searching for, formatting and presenting content. Trending categories may be used to determine templates, grouping or other trending characteristics. Such categories include world, business, entertainment, etc.

Figure 3:
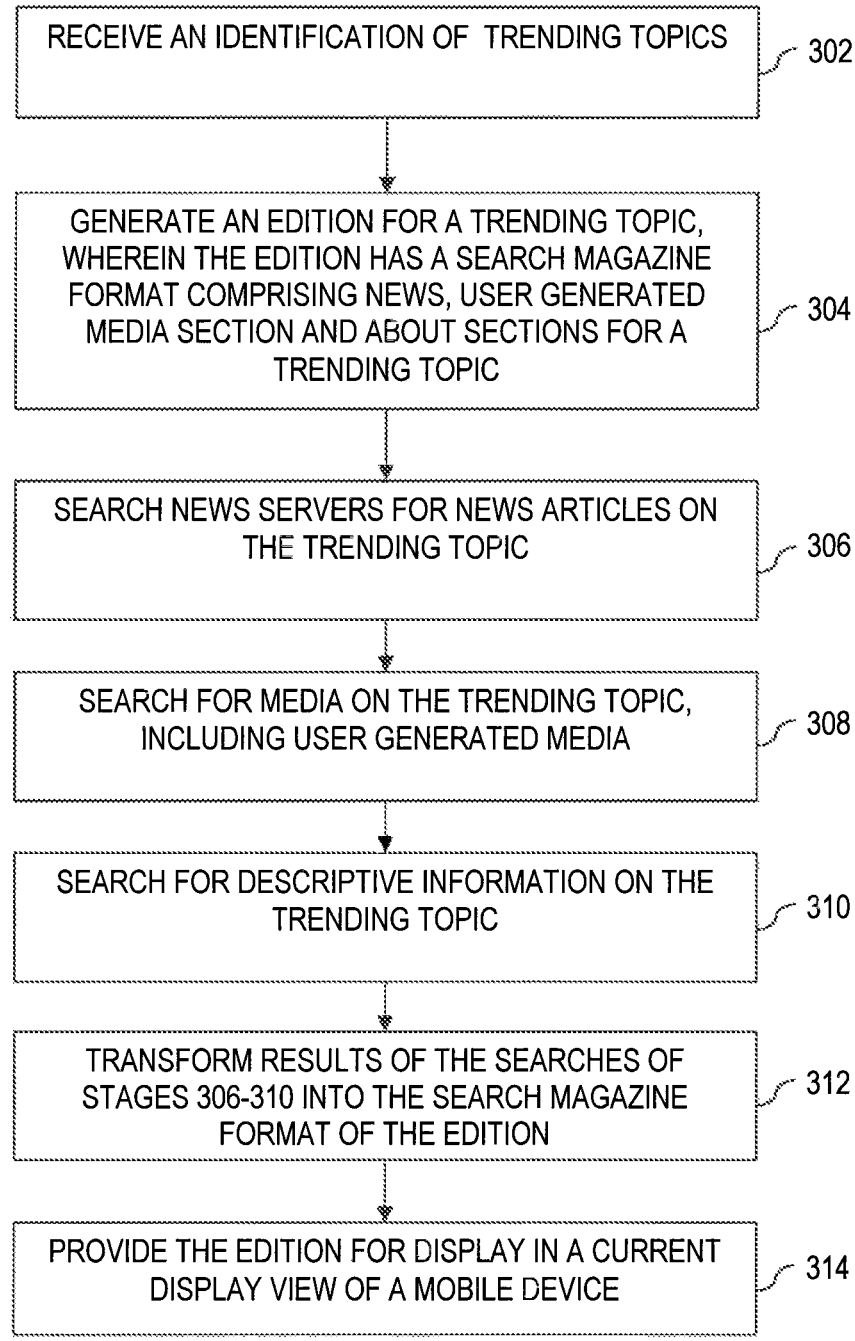
FIG. 3 illustrates a method for trending editions, according to an embodiment.

FIG. 3 is a flowchart illustrating an example method 300 for generating trending magazine editions, according to an embodiment. At stage 302, an identification of one or more trending topics is received. In some cases, news servers are queried for articles on the latest hot topics. A trending topic is detected or selected for generation based on an analysis of the news and corresponding hot topics.

At stage 304, an edition for a trending topic is generated. The edition is developed with a search magazine format. The format includes a news section for news articles retrieved for the trending topic, a user-generated media section for media related to the trending topic shared by users and an about section for descriptive information retrieved for the trending topic.

At stage 306, news servers are searched for news articles on the trending topic. This may include monitoring or navigating multiple news feeds, content sources such as described by content sources 118, websites, broadcasts, media streams, etc.

At stage 308, media on the trending topic is searched. These may be images, sounds, videos, info graphics, live streams, social connections to other users, etc. User-generated media may also be searched, such as popular video upload sites, blogs and social networking sites.

At stage 310, descriptive information on the trending topic is searched for and retrieved. This may populate portions of the trending edition for users seeking to learn more background about the topic. This can also include searches of geographical information systems (GIS), city maps, sky maps or any other navigation information. Sometimes additional information is sought for a topic and the trending edition saves a viewer time and effort.

At stage 312, results of the searches are transformed into the search magazine format of the trending edition. Content returned in searches is organized and formatted into the news, user-generated and info sections based upon a default or a configured layout. Advertisements or recommendations may also be determined based on the trending topic and included in the display view of the search magazine format. Trending metadata may be saved and made available later for trending edition management or for selecting future trending topics for trending editions.

At stage 314, the trending edition is provided for display in a current display view of a mobile device. This may include making the trending edition available to producer server 108 or another distributor so that the template and content may be synchronized and integrated on a mobile device 106.

Trending edition system 210 may be configured to effectively manage the use of network, device and server resources. For example, trending edition icon 406 may be generated and presented on mobile device 106 before the content of the trending edition is fully compiled or synchronized to the mobile device. When the icon is selected the trending edition is displayed in the search magazine format.

Figure 4A:
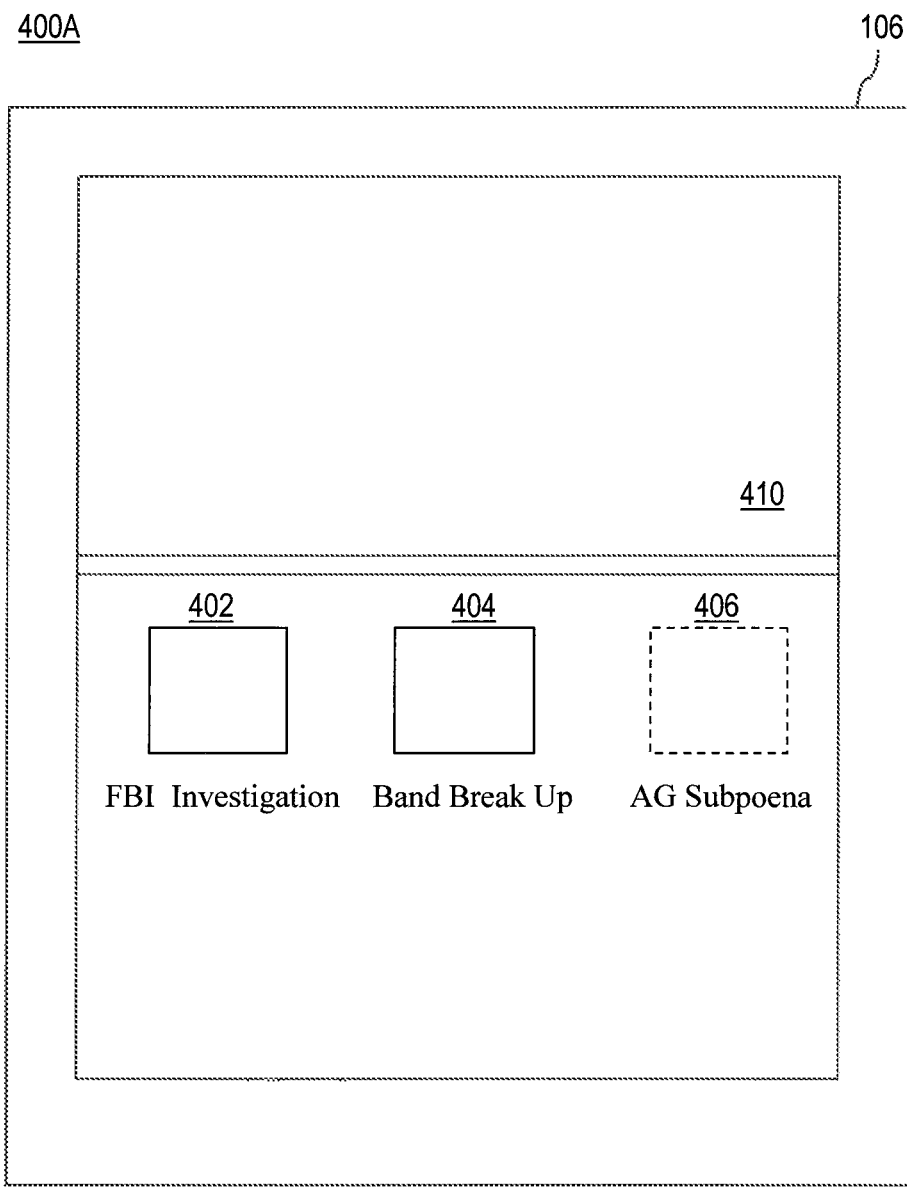
FIGS. 4A-4B illustrate example display views of trending editions, according to an embodiment.

FIG. 4A illustrates an example display view 400A of a current display view on mobile device 106 for trending editions. Trending edition 402 was generated an hour ago based on news surrounding the announcement of an FBI investigation. Trending edition 404 was generated a half hour ago based on updated information about a popular band break up. Trending edition 406 is just now generated based on breaking news of a subpoena issued to the Attorney General. Image 410 may be an image in a candy pane display that displays edition images and seeks to draw user interest on a trending topic. The image may be selected from the article that indicated a trending topic. The image may also be selected from media that was searched and formatted for the trending topic, as discussed in stage 308.

Figure 4B:
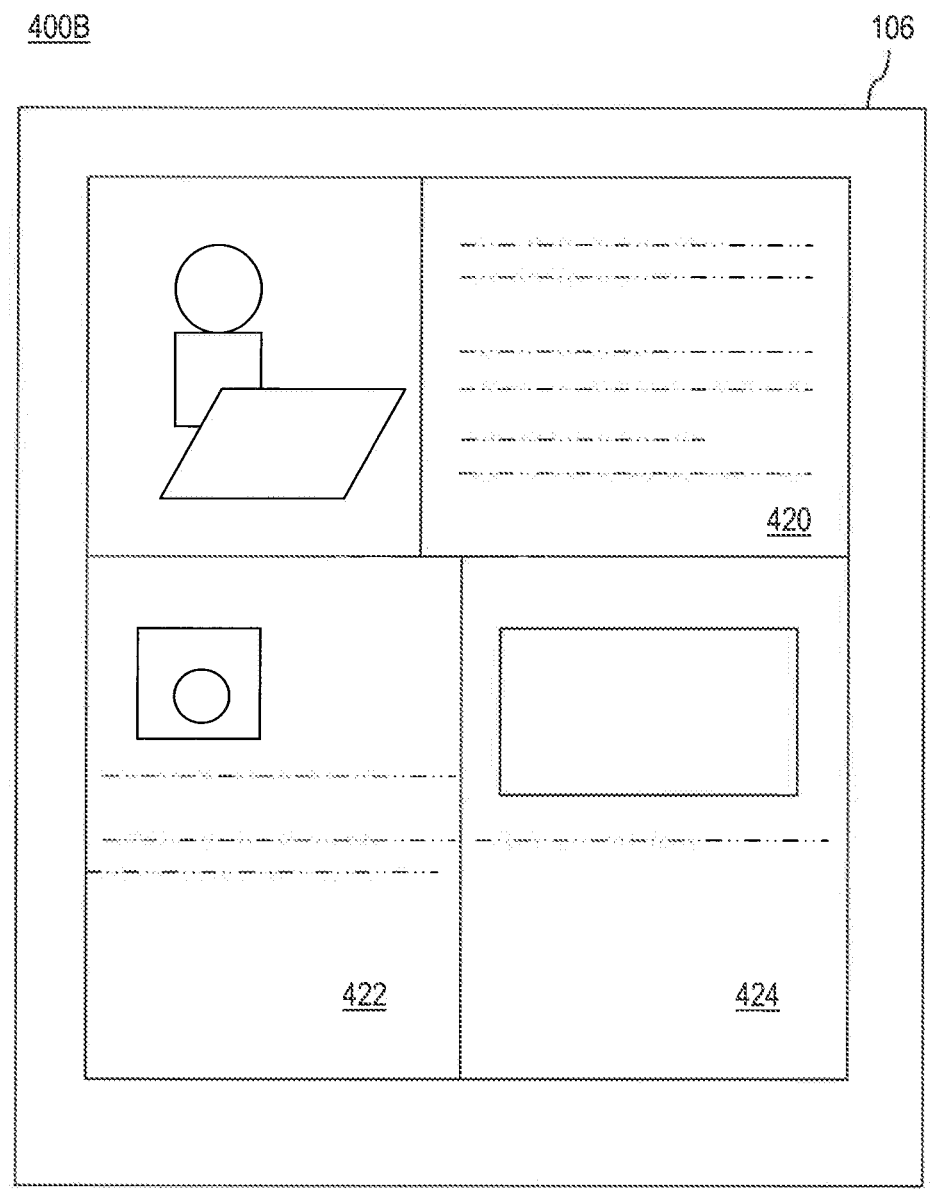

FIG. 4B illustrates an example display 400B of a search magazine format for information and/or content searched for and retrieved on the trending topic. This display includes an article section 420 for a featured article, a panel of articles, or a list of articles. Section 422 may be an about section, such as a CV or summary biography for a person of interest in the article. Section 424 may be a user-generated video capturing a person's comments or personal report on the story or topic.

Searches for sizable media or extended media may be postponed until a user selects the trending edition or indicates an interest in the topic. In some cases, searches may be performed and representative data or images may be displayed or ready for display in display 400B. However, the media content itself may not be downloaded or synchronized until a specific trending edition, section, article, or post is further explored. This setting could also be sensitive to mobile device network data plans. For example, the user-generated video in section 424 may be downloaded to producer server 108 but not synchronized to mobile device 106 until the user's mouse navigates towards the video or the video is selected.

Figure 5:
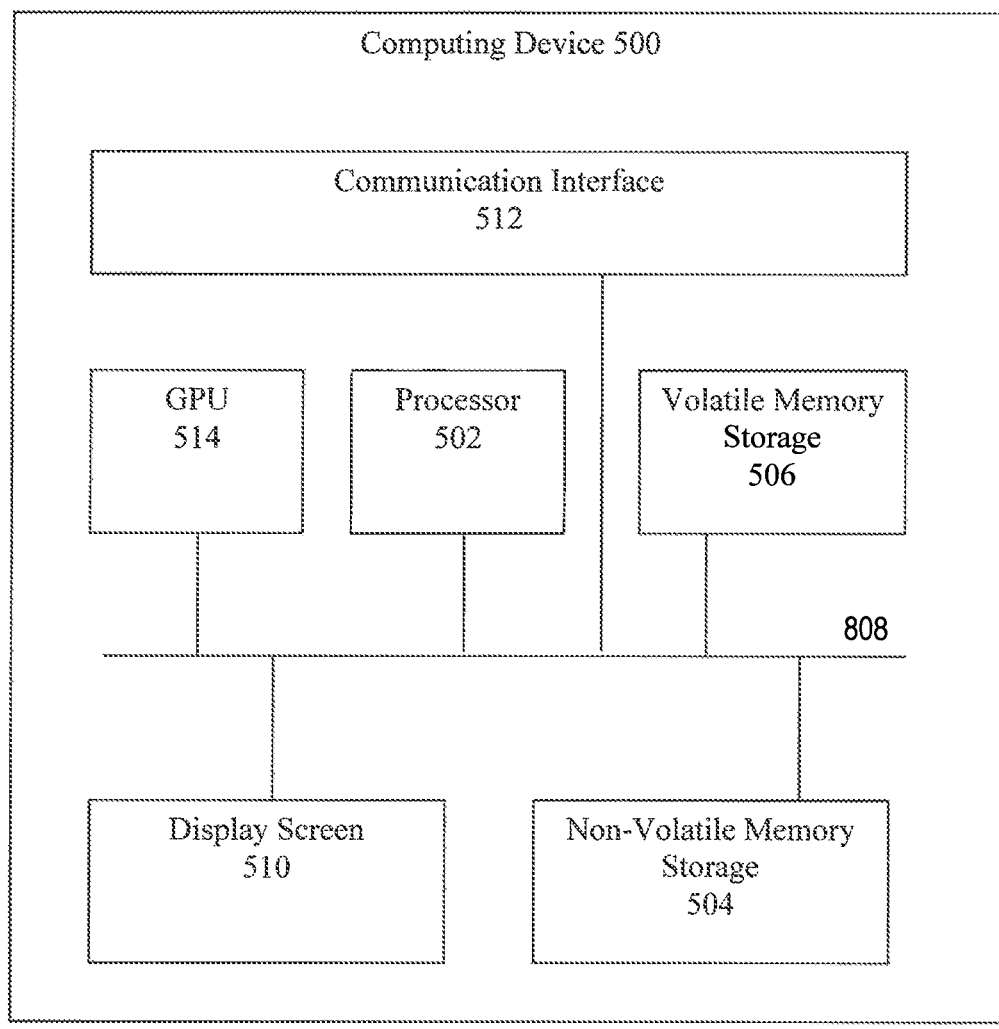
FIG. 5 is a block diagram of a computer system in which embodiments of the invention can be implemented.

FIG. 5 is an example computer system 500 in which embodiments of the present invention, or portions thereof, may be implemented as computer-readable code. For example, the components or modules of trending system 210, such as news analyzer 212, content searcher 214 and edition formatter 216, etc., may be implemented in one or more computer systems 500 using hardware, software, firmware, tangible computer-readable media having instructions stored thereon, or a combination thereof and may be implemented in one or more computer systems or other processing systems. Modules and components in FIGS. 1-4 may be embodied in hardware, software, or any combination thereof.

Computing devices, such as mobile devices 106 or producer server 108, may include one or more processors 502, one or more non-volatile storage mediums 504, one or more memory devices 506, a communication infrastructure 508, a display screen 510 and a communication interface 512.

Processors 502 may include any conventional or special purpose processor, including, but not limited to, digital signal processor (DSP), field programmable gate array (FPGA), application specific integrated circuit (ASIC), and multi-core processors.

GPU 514 is a specialized processor that executes instructions and programs, selected for complex graphics and mathematical operations, in parallel.

Non-volatile storage 504 may include one or more of a hard disk drive, flash memory, and like devices that may store computer program instructions and data on computer-readable media. One or more of non-volatile storage device 704 may be a removable storage device.

Memory devices 506 may include one or more volatile memory devices such as but not limited to, random access memory. Communication infrastructure 508 may include one or more device interconnection buses such as Ethernet, Peripheral Component Interconnect (PCI), and the like.

Typically, computer instructions are executed using one or more processors 502 and can be stored in non-volatile storage medium 504 or memory devices 506.

Display screen 510 allows results of the computer operations to be displayed to a user or an application developer.

Communication interface 512 allows software and data to be transferred between computer system 500 and external devices. Communication interface 512 may include a modem, a network interface (such as an Ethernet card), a communications port, a PCMCIA slot and card, or the like. Software and data transferred via communication interface 512 may be in the form of signals, which may be electronic, electromagnetic, optical, or other signals capable of being received by communication interface 512. These signals may be provided to communication interface 512 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all exemplary embodiments of the present invention as contemplated by the inventor(s), and thus, are not intended to limit the present invention and the appended claims in any way. Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for generating trending search magazines comprising:
    receiving an identification of at least one trending topic in response to a request from a user;
    generating an edition, specified by a publisher, for a trending topic, wherein the trending topic for the edition is selected based on characteristics related to news sources generating articles and characteristics related to sharing activities of different users on a plurality of social media platforms;
    selecting a search magazine layout format of the edition based on a configurable application data model, wherein the publisher configures the application data model differently based on edition content of the edition;
    adjusting the search magazine layout format of the edition, wherein the search magazine layout format is adjusted based on a specific mobile device type of a mobile device associated with the request, and the search magazine layout format includes a news section for display of news articles retrieved for the trending topic and additional sections are included based on the configured application data model;
    searching news servers for the news articles on the trending topic;
    automatically, without user intervention, transforming search results into the adjusted search magazine layout format of the edition; and
    transmitting the edition in the adjusted search magazine layout format that includes the news section with the transformed search results for display in a current display view of the mobile device, matching the specific mobile device type, wherein
        the adjusted search magazine layout format further comprises:
            a user-generated media section that includes media related to the trending topic and shared by the user and additional users, the user-generated media section including a user video upload portion, a user photo upload portion and a user social media portion, wherein layout of the section user-generated media is dynamically adjusted based on the user-generated media related to the trending topic; and
            an about section that includes descriptive information retrieved for the trending topic.

2. The method of claim 1, further comprising searching for extended media and synchronizing a representation of the extended media on the mobile device, the extended media including additional images, videos, audio, and maps related to the trending topic.

3. The method of claim 1, wherein the transforming the search results includes normalizing a title, description, author and excerpt of the search results and including the normalized results in the edition.

4. The method of claim 1, further comprising searching graphical information system (GIS) maps and transmitting related geographical information in the edition.

5. The method of claim 1, further comprising indicating when a trending topic is trending.

6. The method of claim 1, further comprising querying at least one of the news servers for the trending topic.

7. A system for generating trending search magazines comprising:
    at least one computing device comprising a processor and memory;
    a news analyzer configured to receive an identification of at least one trending topic in response to a request from a user;
    an edition formatter configured to:
        generate an edition, specified by a publisher, for a trending topic, wherein the trending topic for the edition is selected based on characteristics related to news sources generating articles and characteristics related to sharing activities of different users on a plurality of social media platforms,
        select a search magazine layout format of the edition based on a configurable application data model, wherein the publisher configures the application data model differently based on edition content of the edition, and adjust the search magazine layout format of the edition, wherein the search magazine layout format is adjusted based on a specific mobile device type of a mobile device associated with the request, and the search magazine layout format includes a news section for display of news articles retrieved for the trending topic and additional sections are included based on the configured application data model; and a content searcher configured to search news servers for news articles on the trending topic, wherein the edition formatter is configured to:

automatically, without user intervention, transform search results into the adjusted search magazine layout format of the edition and transmit the edition in the adjusted search magazine layout format that includes the news section with the transformed search results for display in a current display view of the mobile device, matching the specific mobile device type, wherein the adjusted search magazine layout format further comprises:

a user-generated media section that includes media related to the trending topic and shared by the user and additional users, the user-generated media section including a user video upload portion, a user photo upload portion and a user social media portion, wherein layout of the section user-generated media is dynamically adjusted based on the user-generated media related to the trending topic;

an about section that includes descriptive information retrieved for the trending topic; and the news analyzer, the edition formatter, and the content searcher are implemented on the at least one computing device.

8. The system of claim 7, wherein the content searcher is further configured to search for extended media and synchronize a representation of the extended media on the mobile device, the extended media including additional images, videos, audio, and maps related to the trending topic.

9. The system of claim 7, wherein the edition formatter is further configured to normalize a title, description, author and excerpt and of the search results and include the normalized results in the edition.

10. The system of claim 7, wherein the content searcher is further configured to search graphical information system (GIS) maps and transmit related geographical information in the edition.

11. The system of claim 7, wherein the news analyzer is further configured to query at least one of the news servers for the trending topic.

12. A non-transitory computer readable storage medium having control logic stored therein that, in response to execution by a computing device, causes the computing device to perform operations comprising:

receiving an identification of at least one trending topic in response to a request from a user;

generating an edition, specified by a publisher, for a trending topic, wherein the trending topic for the edition is selected based on characteristics related to news sources generating articles and characteristics related to sharing activities of different users on a plurality of social media platforms;

selecting a search magazine layout format of the edition based on a configurable application data model, wherein the publisher configures the application data model differently based on edition content of the edition;

adjusting the search magazine layout format of the edition, wherein the search magazine layout format is adjusted based on a specific mobile device type of a mobile device associated with the request, and the search magazine layout format includes a news section for display of news articles retrieved for the trending topic and additional sections are included based on the configured application data model;

searching news servers for the news articles on the trending topic;

automatically, without user intervention, transforming search results into the adjusted search magazine layout format of the edition; and transmitting the edition in the adjusted search magazine layout format that includes the news section with the transformed search results for display in a current display view of the mobile device, matching the specific mobile device type, wherein the adjusted search magazine layout format further comprises:

a user-generated media section that includes media related to the trending topic and shared by the user and additional users, the user-generated media section including a user video upload portion, a user photo upload portion and a user social media portion, wherein layout of the section user-generated media is dynamically adjusted based on the user-generated media related to the trending topic; and an about section that includes descriptive information retrieved for the trending topic.

* * * * *